US010084565B1

(12) United States Patent
Kim et al.

(10) Patent No.: US 10,084,565 B1
(45) Date of Patent: Sep. 25, 2018

(54) APPARATUS AND METHOD FOR PROTECTING COMMUNICATION DEVICE OF RAILROAD CAR

(71) Applicant: KOREA RAILROAD RESEARCH INSTITUTE, Uiwang-si (KR)

(72) Inventors: Jung Tai Kim, Seoul (KR); Chi Hyung Ahn, Suwon-si (KR); Jae Hee Kim, Suwon-si (KR); Seh Chan Oh, Suwon-si (KR); Kyeong Jun Ko, Seoul (KR); Sung Soo Park, Yongin-si (KR); Jae Ho Lee, Suwon-si (KR); Sang Hoon Chang, Suwon-si (KR)

(73) Assignee: KOREA RAILROAD RESEARCH INSTITUTE (KR)

( * ) Notice: Subject to any disclaimer, the term of this patent is extended or adjusted under 35 U.S.C. 154(b) by 0 days.

(21) Appl. No.: 15/797,454

(22) Filed: Oct. 30, 2017

(30) Foreign Application Priority Data

Jul. 26, 2017 (KR) ........................ 10-2017-0094912

(51) Int. Cl.
*H04B 1/18* (2006.01)
*H04K 3/00* (2006.01)

(52) U.S. Cl.
CPC ........... *H04K 3/22* (2013.01); *H04K 2203/22* (2013.01)

(58) Field of Classification Search
CPC .. H04K 3/00; H04K 3/20; H04K 3/22; H04K 3/224; H04K 3/226; H04W 48/02;
(Continued)

(56) References Cited

U.S. PATENT DOCUMENTS

2009/0102717 A1* 4/2009 Lok ....................... G01S 7/2813 342/379
2011/0160942 A1 6/2011 Tomioka et al.
(Continued)

FOREIGN PATENT DOCUMENTS

DE 102004048668 A1 4/2006
EP 3056406 A1 8/2016
(Continued)

OTHER PUBLICATIONS

Baldini, Gianmarco et al. "An Early Warning System for Detecting GSM-R Wireless Interference in the High-Speed Raiway Infrastructure." International Journal of Critical Infrastructure Protection, 2010, vol. 3, pp. 140-156.
(Continued)

*Primary Examiner* — Thanh Le
(74) *Attorney, Agent, or Firm* — Schmeiser, Olsen & Watts, LLP

(57) ABSTRACT

An apparatus and method for protecting a communication device of a railroad car is provided. The apparatus includes an antenna portion configured to include main antennas and an auxiliary antenna, a main receiver configured to check a magnitude of a received signal transferred through the main antennas of the antenna portion, an auxiliary receiver configured to check a magnitude of a received signal transferred through the auxiliary antenna of the antenna portion, and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal.

18 Claims, 9 Drawing Sheets

(58) Field of Classification Search
CPC ........... H04W 48/04; H04B 1/10; H04B 1/18; H04B 1/406; H04B 1/1009; H04B 1/1018; H04B 15/00; G01S 7/36; G01S 7/2813; G07S 19/21
See application file for complete search history.

(56) References Cited

U.S. PATENT DOCUMENTS

| | | | | |
|---|---|---|---|---|
| 2012/0115429 | A1* | 5/2012 | Falk | G01S 7/36 455/296 |
| 2014/0375500 | A1* | 12/2014 | Wang | G01S 19/21 342/357.59 |

FOREIGN PATENT DOCUMENTS

| | | | |
|---|---|---|---|
| JP | 2006033545 | A | 2/2006 |
| JP | 2009117928 | A | 5/2009 |
| JP | 2012090034 | A | 5/2012 |
| KR | 1020070066498 | | 6/2007 |
| KR | 20100070791 | A | 6/2010 |
| WO | 2016116343 | A1 | 7/2016 |

OTHER PUBLICATIONS

Extended European Search Report for EP Application No. 17198944.5, dated May 22, 2018.

* cited by examiner (A) TOP-DOWN VIEW OF ARRANGEMENT OF ANNTENAS (B) SIDE VIEW OF ARRANGEMENT OF ANNTENAS

APPARATUS AND METHOD FOR PROTECTING COMMUNICATION DEVICE OF RAILROAD CAR

CROSS-REFERENCE TO RELATED APPLICATION

This application claims priority to and the benefit of Korean Patent Application No. 2017-0094912, filed on Jul. 26, 2017, the disclosure of which is incorporated herein by reference in its entirety.

FIELD OF TECHNOLOGY

The following relates to an apparatus and method for protecting a communication device of railroad cars, and more particularly, to an apparatus and method for protecting a communication device of the railroad cars which make it possible to detect a jamming signal at a front section of the railroad cars in a direction of travel and protect the communication device of the railroad cars by temporarily controlling power of the communication device or power of an antenna when the jamming signal has a greater magnitude than a signal that may be communicated by the communication device.

BACKGROUND

Communication systems of recent railroad cars are being configured in a wireless manner rather than a wired manner or switched to a wireless manner, and there is ongoing research for implementing autonomous driving using information transmitted and received through wireless communication.

The wireless communication manner has features that make it highly convenient, but has a drawback in that safety and security are significantly low.

For example, a railroad car in which a wireless vehicular communication device is installed is exposed to intentional or unintentional jamming signals while travelling. In some situations, the vehicular communication device may break down due to the jamming signals, and safe travel of the railroad cars may be threatened thereafter in a remaining travel distance.

SUMMARY

An aspect relates to an apparatus and method for protecting a communication device of railroad cars which make it possible to detect a jamming signal at a front section of the railroad cars in a direction of travel and protect a vehicular communication device by temporarily controlling power of the communication device or power of an antenna when the jamming signal has a greater magnitude than a signal that may be communicated by the vehicular communication device.

According to a further aspect of embodiments of the present invention, there is provided an apparatus for protecting a communication device of railroad cars, the apparatus including: an antenna portion configured to include main antennas and an auxiliary antenna; a main receiver configured to check a magnitude of a received signal transferred through the main antennas of the antenna portion; an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal.

The magnitude of the signal received by the main receiver may be either an average of a magnitude of the signal received through a primary antenna among the main antennas and magnitudes of the signals received through secondary antennas, or the magnitude of only the signal received through the primary antenna among the main antennas.

The apparatus may further include a power switching portion configured to selectively cut off power applied to a communication device and antenna or selectively control power under control of the controller when the controller determines that there is a jamming signal, wherein the communication device may be a vehicular communication device, the antenna may be an antenna of the vehicular communication device, and the power switching portion may selectively control power applied to at least one of the communication device and transmitter and receiver components of the antenna.

When all or some components of the apparatus break down or are made unable to operate by a jamming signal, the power switching portion may selectively cut off the power applied to the communication device and antenna or selectively control power.

The apparatus may further include a jamming signal storage configured to store, when the controller determines that there is a jamming signal, jamming signal information, wherein the jamming signal information may include a location and time at which the jamming signal is detected, and a pattern or parameter of the jamming signal.

The controller may track the magnitude of the signal received through the auxiliary antenna, store the jamming signal information through the jamming signal storage when the magnitude of the signal received through the auxiliary antenna is a preset reference value or more, and transmit the jamming signal information stored in the jamming signal storage to a terrestrial base station while triggering an alarm and providing a notification to the terrestrial base station.

The main antennas may be directional antennas and include one primary antenna and a plurality of secondary antennas disposed, with the primary antenna as the center, around the primary antenna at a certain preset distance away and a certain preset angular measurement apart, each of the secondary antennas may be formed facing outward from a circumference formed by the secondary antennas at a preset angle with respect to a directional angle of the primary antenna, and the auxiliary antenna may be an omnidirectional antenna.

The main antennas may be directional antennas and array antennas obtained by arranging a preset plurality of antennas at certain intervals in a straight line or a half circle, and the auxiliary antenna may be an omnidirectional antenna.

The apparatus may further include a motor driver configured to adjust a directional angle of the main antennas of the antenna portion toward a terrestrial base station in real time as the railroad cars travel, wherein the controller may control the motor driver based on global positioning system (GPS) information of a current location of the railroad cars and location information of the terrestrial base station stored in a location information storage so that the directional angle of the main antennas is adjusted toward the terrestrial base station.

The main receiver may have an electronic beam-steering function for controlling a directional angle of the main antennas of the antenna portion toward a terrestrial base station in real time as railroad cars run, and the controller may adjust the directional angle of the main antennas toward the terrestrial base station based on GPS information of a current location of the railroad cars and location information of the terrestrial base station stored in a location information storage.

The main receiver may include: a signal receiver configured to convert radio frequency (RF) signals received through individual array antennas into digital values; and a weight assigner configured to calculate a signal reception value based on a directional angle by multiplying the digital value and a weight corresponding to a beam steering angle of each individual array antenna and summing the products.

The controller may compare the magnitude of the received signal of the main antennas and the magnitude of the received signal of the auxiliary antenna, and determine that there is a jamming signal generator in a direction of travel of the railroad cars when the received signal of the auxiliary antenna has a greater magnitude than the received signal of the main antennas.

The apparatus may be disposed in front of and away from a communication device by a distance of v_max(m/s)*t (sec)+B (m) or more, where v_max is a maximum speed of railroad cars, t (sec) is a time until power to the communication device is cut off, and B is a distance margin.

According to another aspect of embodiments of the present invention, there is provided a method of protecting a communication device of railroad cars using an apparatus for protecting a communication device of railroad cars, the method including: checking, by a main receiver, a magnitude of a received signal transferred through main antennas of an antenna portion; checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal.

The magnitude of the signal received by the main receiver may be either an average of a magnitude of the signal received through a primary antenna among the main antennas and magnitudes of the signals received through secondary antennas, or the magnitude of only the signal received through the primary antenna among the main antennas.

The method may further include selectively cutting off, by a power switching portion, power applied to a communication device and antenna or selectively controlling power under control of the controller when the controller determines that there is a jamming signal, wherein the communication device is a vehicular communication device, the antenna is an antenna of the vehicular communication device, and the power switching portion selectively controls power applied to at least one of the communication device and transmitter and receiver components of the antenna.

The method may further include, when all or some components of the apparatus break down or are made unable to operate by a jamming signal, selectively cutting off, by the power switching portion, the power applied to the communication device and antenna or selectively controlling power.

The method may further include, when the controller determines that there is a jamming signal, storing, by a jamming signal storage, jamming signal information, wherein the jamming signal information includes a location and time at which the jamming signal is detected, and a pattern or parameter of the jamming signal.

The method may further include tracking, by the controller, the magnitude of the signal received through the auxiliary antenna, storing jamming signal information through the jamming signal storage when the magnitude of the signal received through the auxiliary antenna is a preset reference value or more, and transmitting the jamming signal information stored in the jamming signal storage to a terrestrial base station while triggering an alarm and providing a notification to the terrestrial base station.

The method may further include controlling, by the controller, a motor driver based on GPS information of a current location of the railroad cars and location information of a terrestrial base station stored in a location information storage as the railroad cars travel so that a directional angle of the main antennas is adjusted toward the terrestrial base station.

The method may further include adjusting, by the controller, the directional angle of the main antennas toward the terrestrial base station based on the GPS information of the current location of the railroad cars and the location information of the terrestrial base station stored in the location information storage through an electronic beam-steering function of the main receiver for adjusting the directional angle of the main antennas of the antenna portion toward a terrestrial base station in real time as the railroad cars travel.

The determining of whether there is a jamming signal may include comparing, by the controller, the magnitude of the received signal of the main antennas and the magnitude of the received signal of the auxiliary antenna, and determining that there is a jamming signal generator in a direction of travel of the railroad cars when the received signal of the auxiliary antenna has a greater magnitude than the received signal of the main antennas.

BRIEF DESCRIPTION

Some of the embodiments will be described in detail, with reference to the following figures, wherein like designations denote like members, wherein.

DETAILED DESCRIPTION

Hereinafter, an apparatus and method for protecting a communication device of a railroad car according to exemplary embodiments of the present invention will be described with reference to the accompanying drawings.

Herein, the drawings may be exaggerated in thicknesses of lines or sizes of components for the sake of convenience and clarity in description. Terms which will be used below are defined in consideration of functionality in embodiments of the present invention, which may vary according to an intention of a user or an operator or a usual practice. Therefore, definitions thereof should be made on the basis of the overall contents of this specification.

Figure 1:
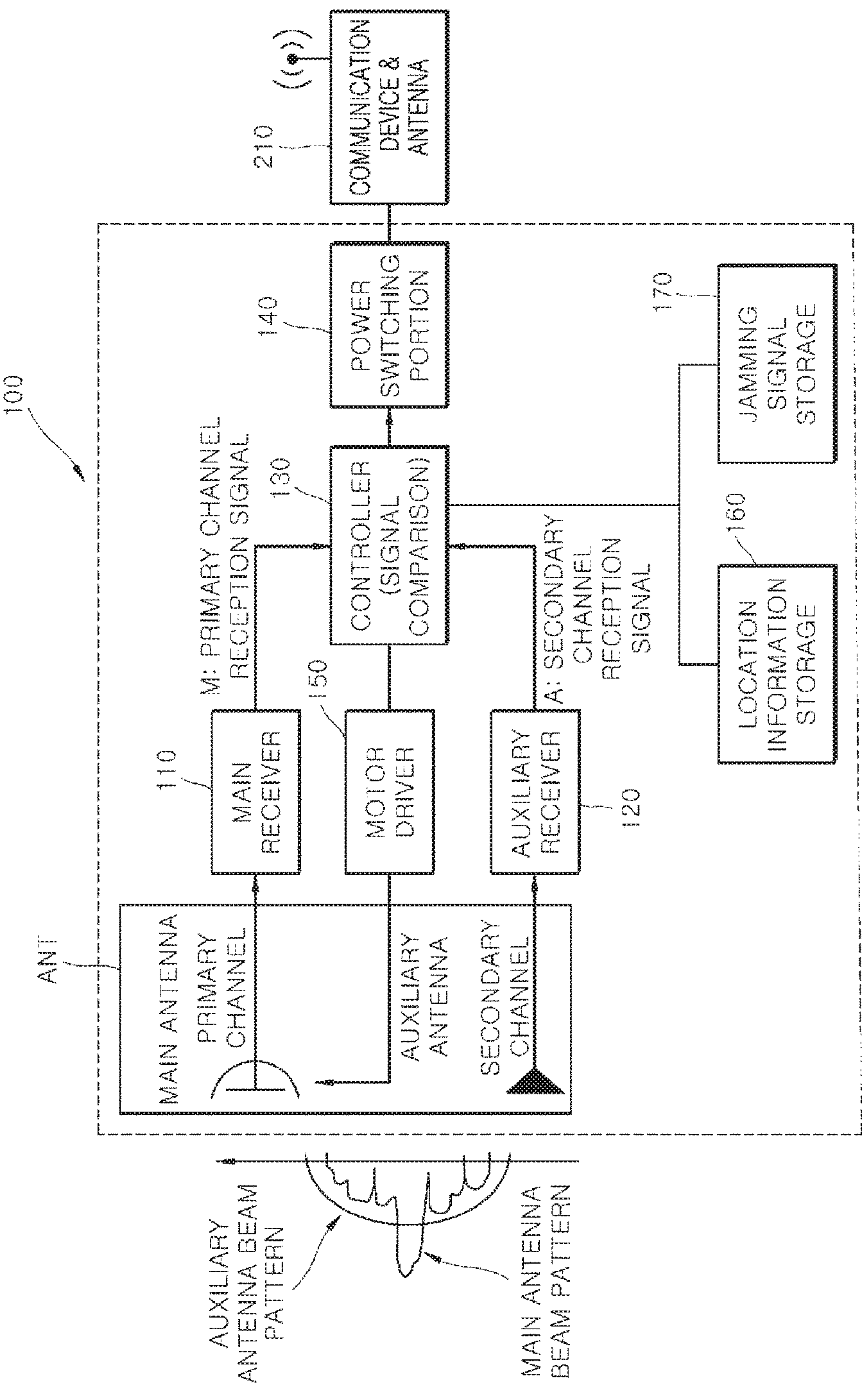
FIG. 1 is an example diagram showing a schematic configuration of an apparatus for protecting a communication device of a railroad car according to an exemplary embodiment of the present invention.

FIG. 1 is an example diagram showing a schematic configuration of an apparatus for protecting a communication device of a railroad car according to an exemplary embodiment of the present invention.

As shown in FIG. 1, an apparatus 100 for protecting a communication device of a railroad car according to the present exemplary embodiment includes an antenna portion ANT, a main receiver 110, an auxiliary receiver 120, a controller 130, a power switching portion 140, a motor driver 150, a location information storage 160, and a jamming signal storage 170.

The antenna portion ANT includes main antennas and an auxiliary antenna.

Figure 2:
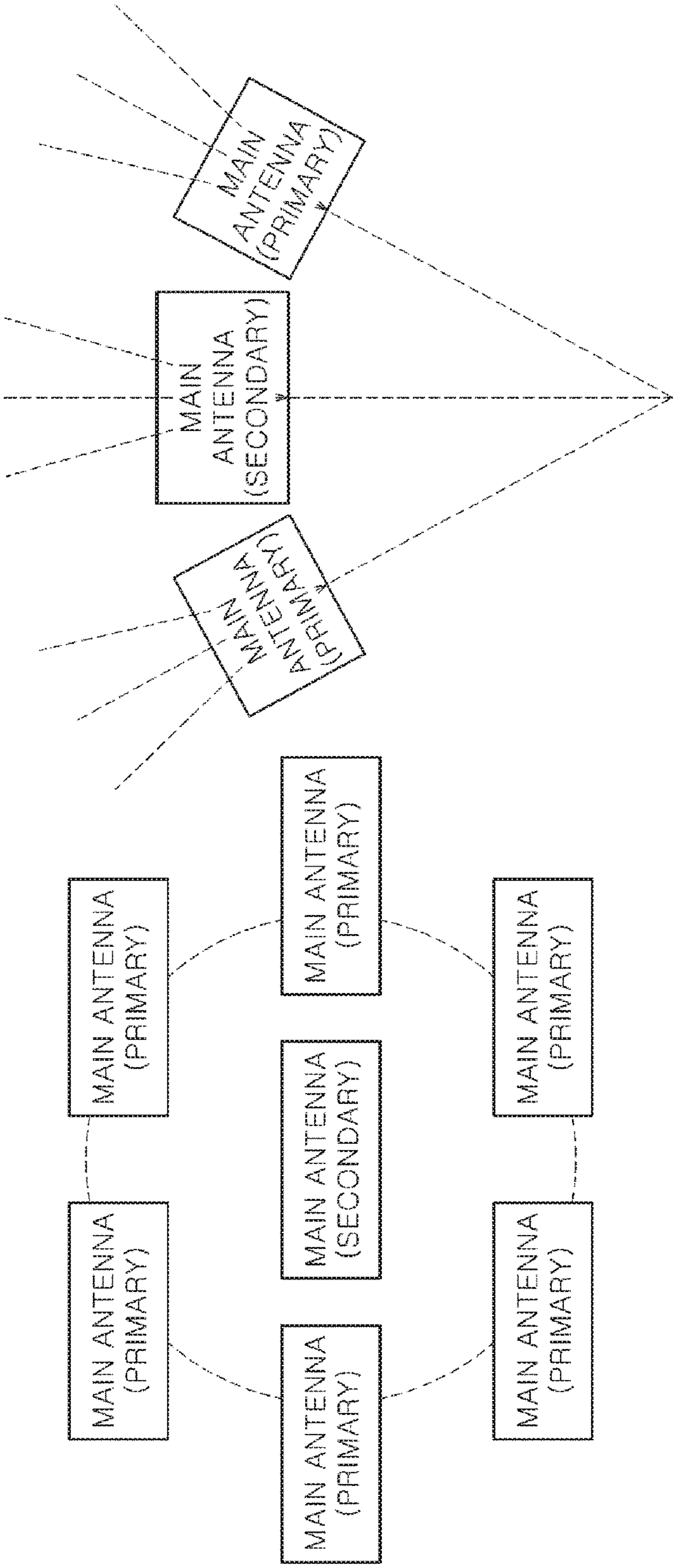
FIG. 2 is an example diagram illustrating an arrangement of main antennas in FIG. 1.

FIG. 2 is an example diagram illustrating an arrangement of main antennas in FIG. 1. (a) of FIG. 2 is an example diagram of a top-down view of an arrangement of antennas, and (b) of FIG. 2 is an example diagram of a side view of an arrangement of antennas.

The main antennas are directional antennas and include, as shown in FIG. 2, one primary antenna and a plurality of (e.g., six) secondary antennas disposed, with the primary antenna (i.e., the main antenna (primary)) as the center, around the primary antenna at a certain preset distance away (e.g., 30 cm from the center of the main antennas) and at a certain preset angular measurement apart (e.g., 60 degrees).

Here, each of the secondary antennas (i.e., main antennas (secondary)) is formed facing outward from the circumference formed by the secondary antennas at a preset angle (e.g., 20 degrees, 30 degrees, or the like) with respect to a directional angle of the primary antenna (i.e., the main antenna (primary)). Here, the secondary antennas (i.e., the main antennas (secondary)) may have different angles. For example, a first secondary antenna (i.e., a main antenna (secondary)), a second secondary antenna (i.e., a main antenna (secondary)), and a third secondary antenna (i.e., a main antenna (secondary)) may be formed at different angles, such as 20 degrees, 22 degrees, and 24 degrees, respectively.

The main antennas including the single primary antenna (i.e., the main antenna (primary)) and the plurality of secondary antennas (i.e., main antennas (secondary)) are integrally formed.

The auxiliary antenna is an omnidirectional antenna.

Figure 3:
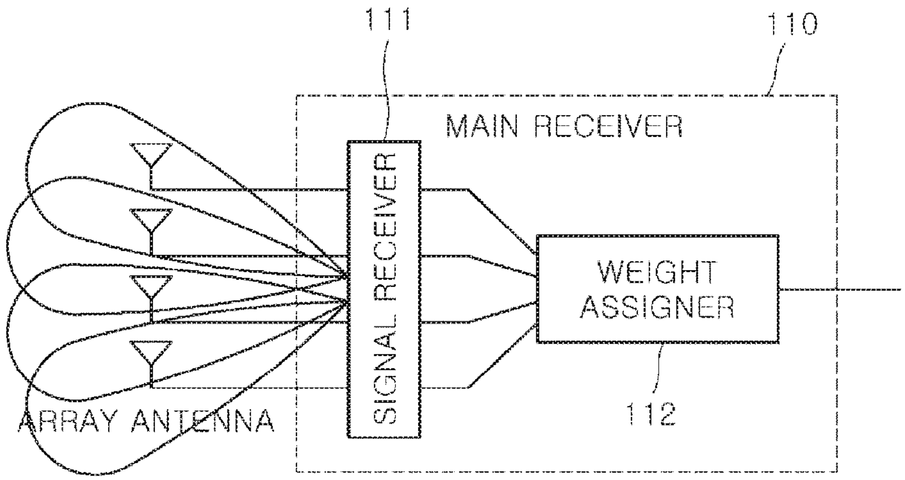
FIG. 3 is an example diagram showing an arrangement of main antennas and a detailed configuration of a main receiver in FIG. 1.

FIG. 3 is an example diagram showing an arrangement of main antennas and a detailed configuration of a main receiver in FIG. 1. The main antennas are array antennas obtained by arranging a plurality of small antennas, and the main receiver 110 includes a signal receiver 111 and a weight assigner 112.

The main antennas are array antennas obtained by arranging a plurality of antennas at predetermined intervals. Here, the shape of the array is a straight line or a half circle, and it is possible to obtain a reception value corresponding to a preset directional angle by multiplying preset weights and individual reception values of the antennas and summing the products. To this end, the signal receiver 111 of the main receiver 110 may convert radio frequency (RF) signals received through the individual array antennas (i.e., channels) into digital values, and the weight assigner 112 of the main receiver 110 may calculate a signal reception value based on the preset directional angle by multiplying the digital value and a weight corresponding to a beam steering angle of each individual array antenna and summing the products.

Figure 4:
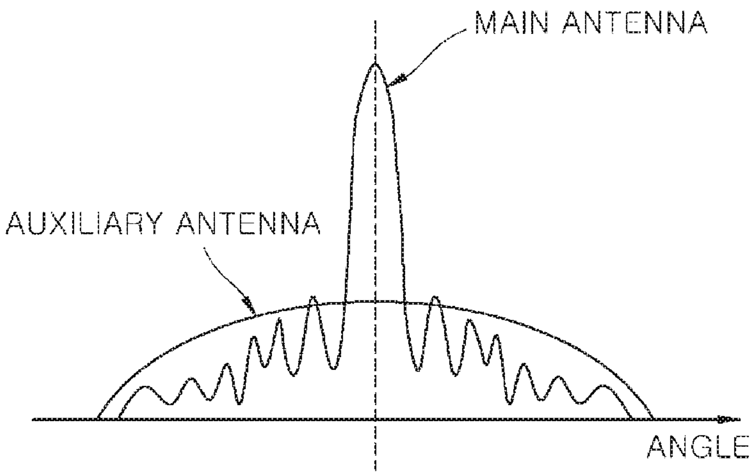
FIG. 4 is an example diagram showing schematic shapes of signals received through a main antenna and an auxiliary antenna in FIG. 1.

FIG. 4 is an example diagram showing schematic shapes of signals received through a main antenna and an auxiliary antenna in FIG. 1. As described above, the main antenna is a directional antenna and has a directional beam pattern, and the auxiliary antenna is an omnidirectional antenna and has an omnidirectional beam pattern. Among the directional beam patterns, a largest signal (i.e., a signal showing the highest sensitivity) is a signal received through the primary antenna (i.e., the main antenna (primary)) which points in a main antenna direction, and relatively smaller signals are signals received through the secondary antennas (i.e., the main antennas (secondary)) among the main antennas (or signals received in directions other than the direction of the main antennas).

Since a beam pattern of a signal received through the main antennas may vary depending on a directional angle of the antenna portion ANT as described above, the controller 130 controls the directional angle of the main antennas of the antenna portion ANT toward a terrestrial base station in real time on the basis of location information of the location information storage 160 and a global positioning system (GPS) receiver (not shown) as the railroad cars travel. The controller 130 controls the directional angle of the antenna portion ANT through the motor driver 150.

The main receiver 110 receives a signal through the main antennas of the antenna portion ANT, checks a magnitude of the received signal, and outputs the magnitude to the controller 130.

The auxiliary receiver 120 receives a signal through the auxiliary antenna of the antenna portion ANT, checks a magnitude of the received signal, and outputs the magnitude to the controller 130.

The controller 130 compares the magnitude of the signal received by the main receiver 110 and the magnitude of the signal received by the auxiliary receiver 120.

At this time, to compare the magnitudes of the received signals, the controller 130 may use, as the magnitude of the signal received by the main receiver 110, an average of a magnitude of a signal received through the primary antenna (i.e., the main antenna (primary)) among the main antennas and magnitudes of signals received through the secondary antennas (i.e., the main antennas (secondary)), or the magnitude of only the signal received through the primary antenna (i.e., the main antenna (primary)) among the main antennas.

The controller 130 determines whether there is a jamming signal on the basis of a result of a comparison between the received two signals (e.g., the received signal of the main antennas and the received signal of the auxiliary antenna. When it is determined that there is a jamming signal, the controller 130 controls power (e.g., a power cut-off or power control) applied to a communication device (a vehicular communication device) and an antenna (an antenna of the vehicular communication device) 210 through the power switching portion 140.

Figure 5:
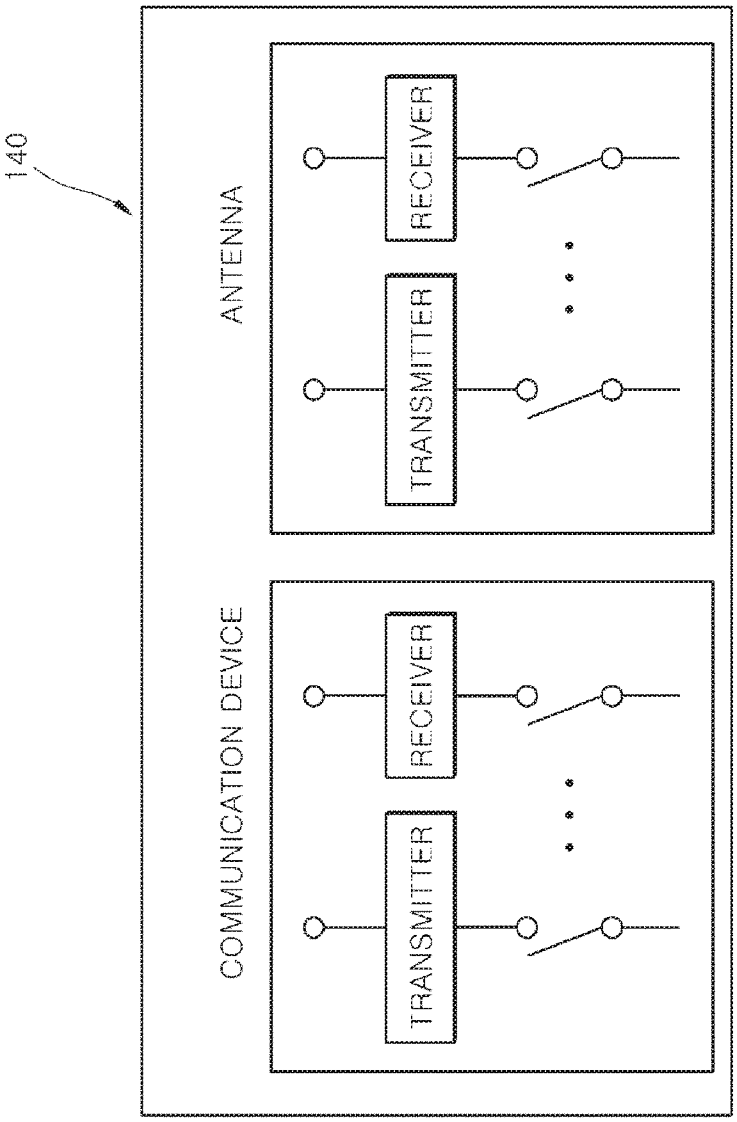
FIG. 5 is an example diagram illustrating operation of a power switching portion in FIG. 1.

FIG. 5 is an example diagram illustrating operation of a power switching portion in FIG. 1. Under control of the controller 130, the power switching portion 140 selectively controls power (e.g., a power cut-off or power control) to a transmitter or a receiver of a communication device or selectively controls power (e.g., a power cut-off or power control) to a transmitter or a receiver of an antenna connected to the communication device.

Here, a transmitter or a receiver conceptually includes at least one component (e.g., an RF receiver, a baseband processor, a data processor, and the like) (not shown) present in a transmission path or a reception path of a communication device (or an antenna). Therefore, selectively controlling of power (e.g., a power cut-off or power control) to the transmitter or the receiver includes controlling power (e.g., a power cut-off or power control) of at least one component (e.g., an RF receiver, a baseband processor, a data processor, and the like) (not shown) present in the transmission path or the reception path.

When it is determined that there is a jamming signal, the jamming signal storage 170 stores jamming signal information (e.g., a location, a time, a pattern or parameter of the received signal).

In other words, the controller 130 tracks a magnitude of a signal received through the auxiliary antenna and stores jamming signal information (e.g., a location, a time, a pattern or parameter of the received signal) through the jamming signal storage 170 when the magnitude of the signal received through the auxiliary antenna is a preset reference value or more. Also, the controller 130 triggers an alarm and provides a notification (e.g., that caution is required because a jamming signal generator is near) to a terrestrial base station.

Meanwhile, although not shown in FIG. 1, the GPS receiver (not shown) for determining a current location of the railroad cars currently travelling is further included.

Figure 6:
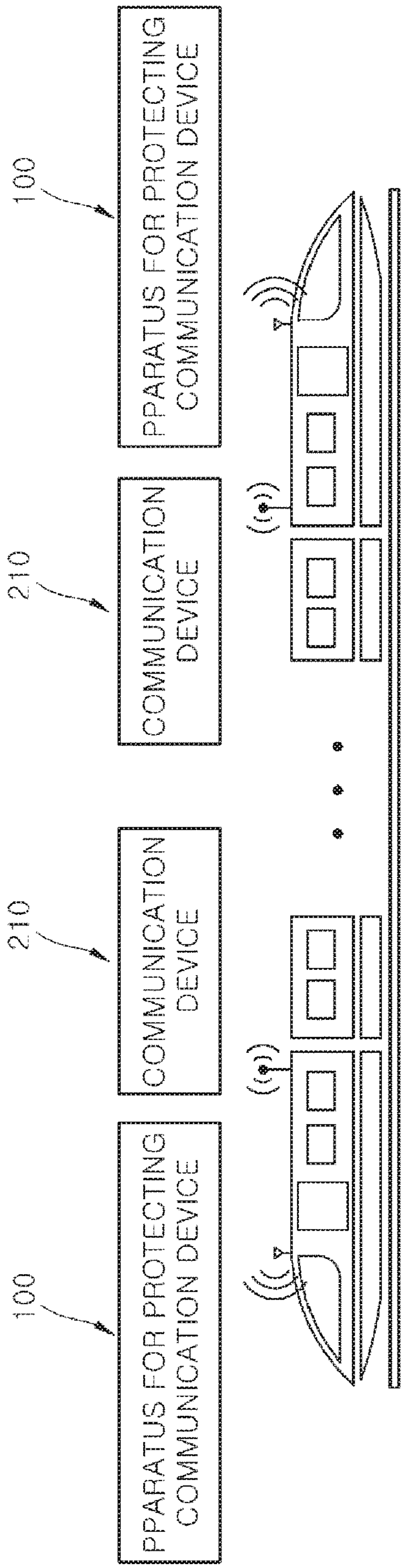
FIG. 6 is an example diagram showing installation positions of apparatuses for protecting a communication device of a railroad car according to the present embodiment.

FIG. 6 is an example diagram showing installation positions of apparatuses for protecting a communication device of railroad cars according to the present embodiment. As shown in the drawing, the apparatus 100 for protecting a communication device according to the present exemplary embodiment is installed at each front section of the railroad cars in each of their directions of travel. In other words, since railroad cars can travel in two directions, the apparatus 100 may be installed in front of each communication device 210 in a front section and a rear section of the railroad cars or may be integrally formed with each of the communication devices 210.

Since the railroad cars according to the present exemplary embodiment have long car bodies, the front section and the rear section are a specific distance (e.g., tens of meters) away from each other.

Therefore, when a jamming signal is detected, the apparatus 100 turns off a communication device 210 which is right behind the apparatus 100 and then allows communication through a communication device on the opposite end (i.e., a communication device in the rear part of the railroad cars when an apparatus for protecting a communication device in the front section detects a jamming signal). Also, after the front section of the railroad cars passes through a section in which the jamming signal is received, power may be supplied again to the communication device in the front section so that communication may be performed by using the communication device in the front section, and power to the communication device in the rear part may be cut off so that the communication device in the rear part may be protected from the jamming signal.

In other words, the apparatuses 100 for protecting a communication device according to the present exemplary embodiment and the communication devices 210 are disposed by considering that such railroad cars have long lengths.

More specifically, the reason that a communication device 210 and an apparatus 100 is disposed at each end (a front section and a rear section) of the railroad cars in the present exemplary embodiment is that a travel direction (forward and backward) of the railroad cars may be changed. Also, it is possible to rapidly receive and use movement authority information of the railroad cars and the like and (e.g., acceleration or deceleration) only when communication is received at a front section of the railroad cars in a direction of travel.

According to another exemplary embodiment of the present invention, assuming that the railroad cars are travelling toward the right in FIG. 6, when the railroad cars continuously travel to the right side after the apparatus 100 in a front section of the railroad cars on the right side receives a jamming signal from a jamming signal generator (or after the apparatus 100 is affected by the jamming signal generator), the communication device 210 in the front section on the right side receives the jamming signal from the jamming signal generator (or is affected by the jamming signal generator).

Therefore, assuming that the apparatus 100 determines whether there is a jamming signal generator and transmits a control signal (e.g., a signal for controlling power) to the communication device 210, when a time until power to the communication device 210 is cut off is t (sec), it is necessary to space the communication device 210 and the apparatus 100 by a distance of v_max(m/s)*t (sec)+B (m) or more. Here, v_max is a maximum speed of the railroad cars, and B is a distance margin in which a beam width of the jamming signal generator is taken into consideration.

When the maximum speed v_max of the railroad cars is 400 km/h (111.11 m/s), t=100 ms, and B=2 m, it is possible to see that the communication device 210 and the apparatus 100 should be spaced by about 13.11 m or more by substituting the values into the above expression.

One railroad car has a length of about 20 m. Therefore, when the apparatus 100 and the communication device 210 are disposed at a front section and a rear section of a single railroad car as shown in FIG. 6 and t is smaller than 160 ms, the apparatus 100 is still able to sense that there is a jamming signal and then control power of the communication device 210.

Figure 7:
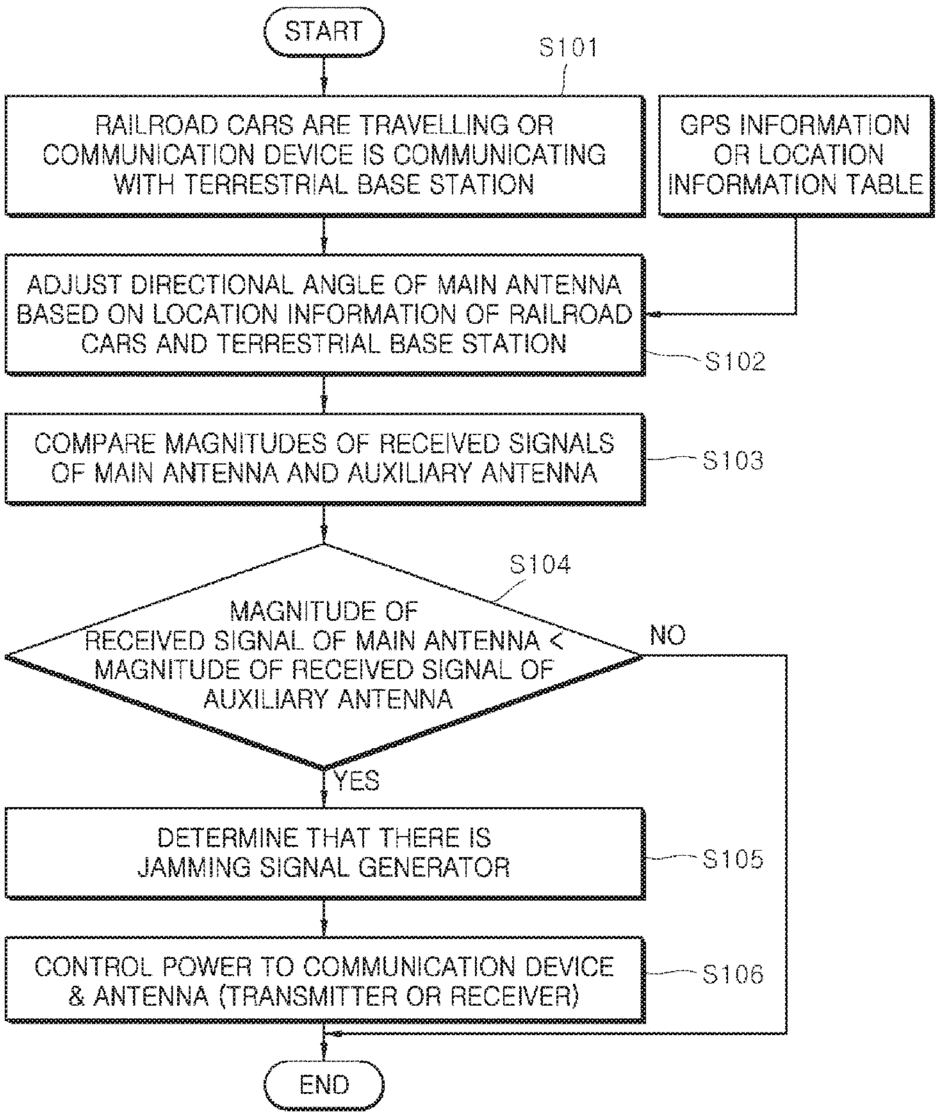
FIG. 7 is a flowchart illustrating a method of protecting a communication device using an apparatus for protecting a communication device of a railroad car according to a first exemplary embodiment of the present invention.
Figure 8:
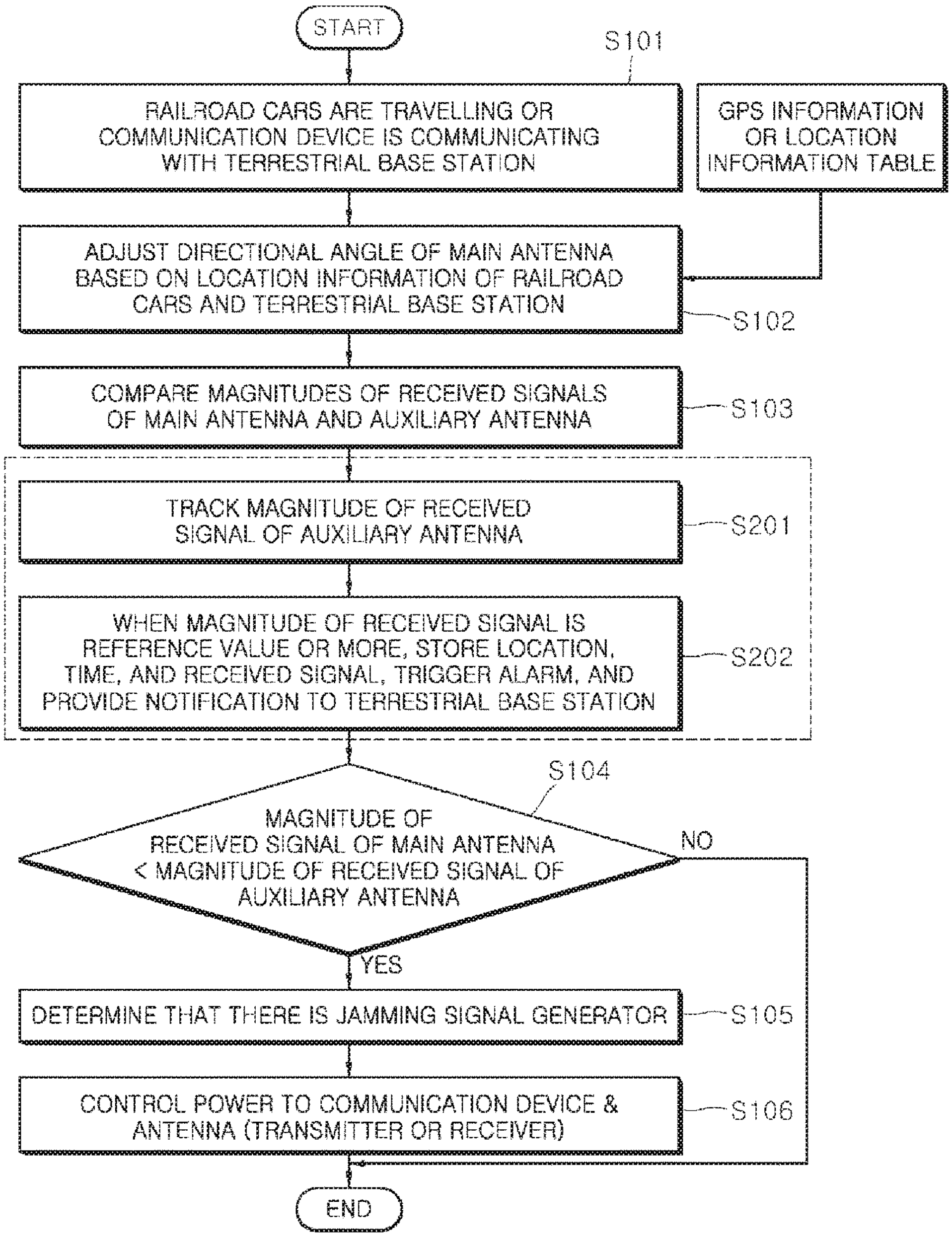
FIG. 8 is a flowchart illustrating a method of protecting a communication device using an apparatus for protecting a communication device of a railroad car according to a second exemplary embodiment of the present invention.

FIG. 7 is a flowchart illustrating a method of protecting a communication device using an apparatus for protecting a communication device of railroad cars according to a first exemplary embodiment of the present invention, and FIG. 8 is a flowchart illustrating a method of protecting a communication device by an apparatus for protecting a communication device of railroad cars according to a second exemplary embodiment of the present invention. With regard to FIG. 8, only parts different from the method of FIG. 7 will be described below.

First, referring to FIG. 7, when railroad cars are travelling or a communication device of the railroad cars (i.e., a vehicular communication device) is communicating with a terrestrial base station (or a terrestrial communication device) (S101), the controller 130 adjusts a directional angle of main antennas toward the terrestrial base station on the basis of GPS information of the railroad cars (i.e., current location information of the railroad cars) and location information of the terrestrial base station (or a location information table) stored in the location information storage 160 (S102).

Here, the directional angle of the main antennas is adjusted in real time as the railroad cars travel. In other words, a primary antenna among the main antennas (i.e., a main antenna (primary)) is directed toward the terrestrial base station in real time.

Meanwhile, the controller 130 compares magnitudes of signals individually received through the main antennas and an auxiliary antenna (S103).

Figure 9:
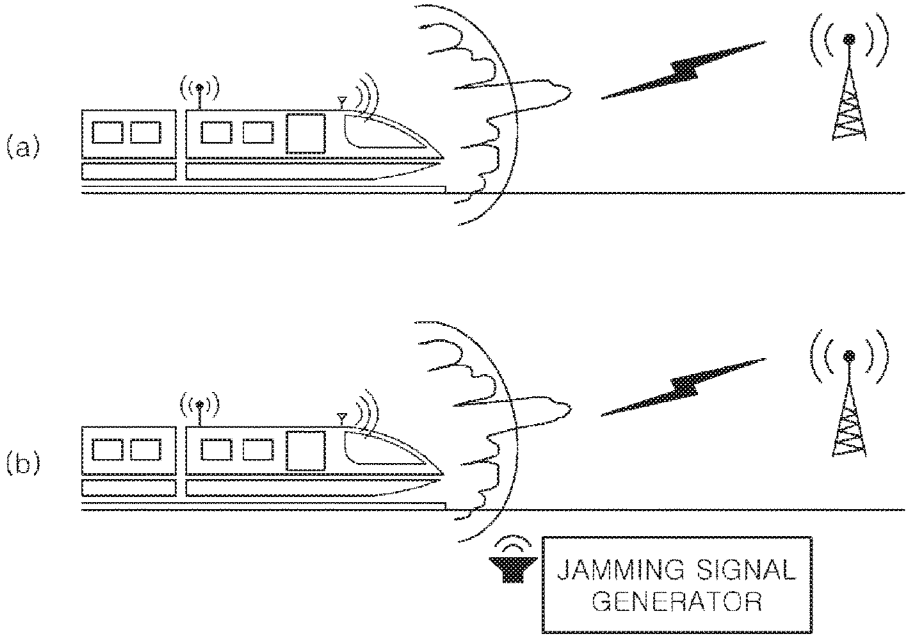
FIG. 9 is an example diagram illustrating a difference in magnitude of a received signal depending on a position of a jamming signal generator in FIG. 1.

FIG. 9 is an example diagram illustrating a difference in magnitude of a received signal depending on a position of a jamming signal generator in FIG. 1. As shown in (a) of FIG. 9, when there is no jamming signal generator between a vehicular communication device and a terrestrial base station, a signal received through a primary antenna among main antennas has a greater magnitude than a signal received through an auxiliary antenna. In this case, the controller 130 determines that there is no jamming signal generator and does not control power to the communication device and antenna 210, so that normal communication may be performed.

On the other hand, as shown in (b) of FIG. 9, when there is a jamming signal generator between a vehicular communication device and a terrestrial base station, a signal received through a primary antenna among main antennas has a smaller magnitude than a signal received through an auxiliary antenna. In this case, the controller 130 selectively controls the power to the communication device and antenna 210 (particularly, power to a receiver) and thereby prevents a malfunction (an error) or a breakdown of the communication device (i.e., a vehicular communication device) caused by a jamming signal.

Then, as described above with reference to FIG. 9, the controller 130 checks whether the received signal of the auxiliary antenna has a greater magnitude than the received signal of the main antennas by comparing the magnitude of the signal received through the main antennas and the magnitude of the signal received through the auxiliary antenna (S104).

Depending on a result of the check (S104), when the received signal of the auxiliary antenna has a greater magnitude than the received signal of the main antennas (YES at S104), the controller 130 determines that there is a jamming signal generator in a direction of travel of the railroad cars (S105).

When it is determined that there is a jamming signal generator in the direction of travel of the railroad cars as described above, the controller 130 selectively controls the power (e.g., a power cut-off or power control) to the communication device and antenna 210 (particularly, the power of the receiver) without delay (S106).

Accordingly, a malfunction (an error) or a breakdown of a communication device (i.e., a vehicular communication device) caused by a jamming signal is prevented.

For example, while cutting off the power to the communication device and antenna 210 (particularly, the power of the receiver) for a certain time (e.g., until a corresponding railroad car moves to a location at which the influence of the jamming signal wanes), the controller 130 may transmit a current status to the terrestrial base station through a transmitter. Accordingly, the terrestrial base station notifies other railroad cars and makes it possible to find and deal with the jamming signal generator.

However, as shown in FIG. 8, the controller 130 may store jamming signal information (e.g., a location, a time, a pattern or parameter of the received signal) in the jamming signal storage 170 and transmit the information to the terrestrial base station so that the terrestrial base station may easily find the jamming signal generator.

More specifically, referring to FIG. 8, the controller 130 tracks the magnitude of the signal received through the auxiliary antenna (S201) and stores the jamming signal information (e.g., the location, the time, the pattern or parameter of the received signal) through the jamming signal storage 170 when the magnitude of the signal received through the auxiliary antenna is a preset reference value or more. Also, controller 130 triggers an alarm and provides a notification (e.g., that caution is required because a jamming signal generator is near) to the terrestrial base station (S202).

Meanwhile, a method of cutting off power to a communication device (or an antenna) to prevent device damage caused by a jamming signal (i.e., system damage which may be caused by signal detection through content analysis and removal of the jamming signal) has been described in the above exemplary embodiment, but the jamming signal may damage (or make unable to operate) an apparatus for protecting a communication device of a railroad car according to the present exemplary embodiment, particularly important components related to jamming signal analysis such as the main receiver 110, the auxiliary receiver 120, the controller 130, and the like. To prepare for such a situation, according to the present exemplary embodiment, the power switching portion 140 may control the power to the communication device and antenna 210 even when at least one of the main receiver 110, the auxiliary receiver 120, and the controller 130 is damaged (or made unable to operate) (i.e., even when a normal signal is not output from the components).

Accordingly, a terrestrial base station may easily find a jamming signal generator on the basis of jamming signal information and take a countermeasure. Also, suboptimal communication circumstances lead to railroad cars travelling slowly and cautiously so that an accident may be prevented.

As described above, since an apparatus for protecting a communication device of a railroad car according to the present exemplary embodiment determines whether there is a jamming signal on the basis of only a magnitude of a received signal without analyzing content of exchanged signals, it is possible to prevent device damage caused by a jamming signal (i.e., system damage which may be caused by signal detection through content analysis and removal of the jamming signal). In addition, it is possible to obtain an economic benefit of a reduction in production costs by lowering signal sensitivity and gain.

According to an aspect of the present invention, embodiments of the present invention make it possible to detect a jamming signal at a front section of railroad cars in a direction of travel, protect a vehicular communication device by temporarily controlling power to the communication device or power to an antenna when the jamming signal has a greater magnitude than a signal that may be communicated by the vehicular communication device, and resume communication by supplying power to the vehicular communication device or the antenna when the front section moves away from an affected section of travel, thereby ensuring safe travel of the railroad cars in a remaining travel distance.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

wherein the magnitude of the signal received by the main receiver is either an average of a magnitude of the signal received through a primary antenna among the main antennas and magnitudes of the signals received through secondary antennas among the main antennas, or the magnitude of only the signal received through the primary antenna among the main antennas.

2. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal; and a power switching portion configured to, under control of the controller when the controller determines that there is a jamming signal, selectively cut off power applied to a communication device and antenna or selectively control power, wherein the communication device is a vehicular communication device, the antenna is an antenna of the vehicular communication device, and the power switching portion selectively cuts off power applied to at least one of the communication device and transmitter and receiver components of the antenna.

3. The apparatus of claim 2, wherein when all or some components of the apparatus break down or are made unable to operate by a jamming signal, the power switching portion selectively cuts off the power applied to the communication device and antenna or selectively controls power.

4. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

a jamming signal storage configured to store, when the controller determines that there is a jamming signal, jamming signal information, wherein the jamming signal information includes a location and time at which the jamming signal is detected, and a pattern or parameter of the jamming signal.

5. The apparatus of claim 4, wherein the controller tracks the magnitude of the signal received through the auxiliary antenna, stores the jamming signal information through the jamming signal storage when the magnitude of the signal received through the auxiliary antenna is a preset reference value or more, and transmits the jamming signal information stored in the jamming signal storage to a terrestrial base station while triggering an alarm and providing a notification to the terrestrial base station.

6. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

wherein the main antennas are directional antennas and include one primary antenna and a plurality of secondary antennas disposed, with the primary antenna as the center, around the primary antenna at a certain preset distance away and at a certain preset angular measurement apart, each of the secondary antennas is formed facing outward from a circumference formed by the secondary antennas at a preset angle with respect to a directional angle of the primary antenna, and the auxiliary antenna is an omnidirectional antenna.

7. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

wherein the main antennas are directional antennas and array antennas obtained by arranging a preset plurality of antennas at certain intervals in a straight line or a half circle in shape, and the auxiliary antenna is an omnidirectional antenna.

8. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion, and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal; and a motor driver configured to control a directional angle of the main antennas of the antenna portion toward a terrestrial base station in real time as the railroad cars travel, wherein the controller controls the motor driver based on global positioning system (GPS) information of a current location of the railroad cars and location information of the terrestrial base station stored in a location information storage so that the directional angle of the main antennas is adjusted toward the terrestrial base station.

9. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

wherein the main receiver has an electronic beam-steering function for controlling a directional angle of the main antennas of the antenna portion toward a terrestrial base station in real time as the railroad cars travel, and the controller adjusts the directional angle of the main antennas toward the terrestrial base station based on global positioning system (GPS) information of a current location of the railroad cars and location information of the terrestrial base station stored in a location information storage.

10. The apparatus of claim 9, wherein the main receiver comprises:

a signal receiver configured to convert radio frequency (RF) signals received through individual array antennas into digital values; and a weight assigner configured to calculate a signal reception value based on a directional angle by multiplying the digital value and a weight corresponding to a beam steering angle of each individual array antenna and summing products.

11. An apparatus for protecting a communication device of railroad cars, the apparatus comprising:

an antenna portion configured to include main antennas and an auxiliary antenna;

a main receiver configured to check a magnitude of a received signal transferred through the main antennas of the antenna portion;

an auxiliary receiver configured to check a magnitude of a received signal transferred through the auxiliary antenna of the antenna portion; and a controller configured to compare the magnitude of the signal received by the main receiver and the magnitude of the signal received by the auxiliary receiver, determine whether there is a jamming signal according to a comparison result, and take a preset countermeasure when it is determined that there is a jamming signal;

wherein the controller compares the magnitude of the received signal of the main antennas and the magnitude of the received signal of the auxiliary antenna, and determines that there is a jamming signal generator in a direction of travel of the railroad cars when the received signal of the auxiliary antenna has a greater magnitude than the received signal of the main antennas.

12. A method of protecting a communication device of railroad cars using an apparatus for protecting a communication device of railroad cars, the method comprising:

checking, by a main receiver, a magnitude of a received signal transferred through main antennas of an antenna portion;

checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal;

wherein the magnitude of the signal received by the main receiver is either an average of a magnitude of the signal received through a primary antenna among the main antennas and magnitudes of the signals received through secondary antennas, or the magnitude of only the signal received through the primary antenna among the main antennas.

13. A method of protecting a communication device of railroad cars using an apparatus for protecting a communication device of railroad cars, the method comprising:

checking, by a main receiver, a magnitude of a received signal transferred through main antennas of an antenna portion;

checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal;

selectively cutting off, by a power switching portion, power applied to a communication device and antenna or selectively controlling power under control of the controller when the controller determines that there is a jamming signal, wherein the communication device is a vehicular communication device, the antenna is an antenna of the vehicular communication device, and the power switching portion selectively controls power applied to at least one of the communication device and transmitter and receiver components of the antenna.

14. A method of protecting a communication device of railroad cars using an apparatus for protecting a communication device of railroad cars, the method comprising:

checking, by a main receiver, a magnitude of a received signal transferred through main antennas of an antenna portion;

checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal;

when all or some components of the apparatus break down or are made unable to operate by a jamming signal, selectively cutting off, by a power switching portion, power applied to a communication device and antenna or selectively controlling power.

15. A method of protecting a communication device of railroad cars using an apparatus for protecting a communication device of railroad cars, the method comprising:

checking, by a main receiver, a magnitude of a received signal transferred through main antennas of an antenna portion;

checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal;

when the controller determines that there is a jamming signal, storing, by a jamming signal storage, information on the jamming signal, wherein the jamming signal information includes a location and time at which the jamming signal is detected, and a pattern or parameter of the jamming signal.

16. The method of claim 15, further comprising:

tracking, by the controller, the magnitude of the signal received through the auxiliary antenna, storing jamming signal information through the jamming signal storage when the magnitude of the signal received through the auxiliary antenna is a preset reference value or more, and transmitting the jamming signal information stored in the jamming signal storage to a terrestrial base station while triggering an alarm and providing a notification to the terrestrial base station.

17. A method of protecting a communication device of railroad cars using an apparatus for protecting a communication device of railroad cars, the method comprising:

checking, by a main receiver, a magnitude of a received signal transferred through main antennas of an antenna portion;

checking, by an auxiliary receiver, a magnitude of a received signal transferred through an auxiliary antenna of the antenna portion; and comparing, by a controller, the magnitude of the signal received by the main receiver and the magnitude of the signal received by the auxiliary receiver, determining whether there is a jamming signal according to a comparison result, and taking a preset countermeasure when it is determined that there is a jamming signal;

controlling, by the controller, a motor driver based on global positioning system (GPS) information of a current location of the railroad cars and location information of a terrestrial base station stored in a location information storage as the railroad cars travel so that a directional angle of the main antennas is adjusted toward the terrestrial base station.

18. The method of claim 17, further comprising:

adjusting, by the controller, the directional angle of the main antennas toward the terrestrial base station based on the GPS information of the current location of the railroad cars and the location information of the terrestrial base station stored in the location information storage through an electronic beam-steering function of the main receiver for controlling the directional angle of the main antennas of the antenna portion toward a terrestrial base station in real time as the railroad cars run.

* * * * *